United States Patent
Hashimoto et al.

(10) Patent No.: US 8,490,740 B2
(45) Date of Patent: Jul. 23, 2013

(54) VEHICLE

(75) Inventors: Keita Hashimoto, Toyota (JP); Katsumi Tsuchida, Toyota (JP); Yasuharu Terada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/387,028

(22) PCT Filed: Mar. 15, 2010

(86) PCT No.: PCT/JP2010/054312
§ 371 (c)(1),
(2), (4) Date: Jan. 25, 2012

(87) PCT Pub. No.: WO2011/114417
PCT Pub. Date: Sep. 22, 2011

(65) Prior Publication Data
US 2012/0125705 A1    May 24, 2012

(51) Int. Cl.
*B60K 13/04*    (2006.01)

(52) U.S. Cl.
USPC .............................. 180/309; 60/274; 60/300

(58) Field of Classification Search
USPC ................ 180/65.21, 309; 60/272, 274, 299, 60/300; 219/202
See application file for complete search history.

(56) References Cited

U.S. PATENT DOCUMENTS

| 5,323,868 | A  |   | 6/1994  | Kawashima |
|-----------|----|---|---------|-----------|
| 6,003,304 | A  | * | 12/1999 | Swanson et al. ................. 60/274 |
| 8,091,663 | B2 | * | 1/2012  | Ichikawa ................. 180/65.265 |
| 8,290,682 | B2 | * | 10/2012 | Ewert et al. ..................... 701/99 |
| 2009/0277705 | A1 |   | 11/2009 | Ichikawa |

FOREIGN PATENT DOCUMENTS

| JP | 04-331402 A | 11/1992 |
| JP | 06-178401 A | 6/1994 |
| JP | 06-261420 A | 9/1994 |
| JP | A-07-071236 | 3/1995 |
| JP | A-2004-192820 | 7/2004 |
| JP | A-2005-184869 | 7/2005 |
| JP | A-2009-274471 | 11/2009 |
| JP | A-2009-274479 | 11/2009 |
| JP | A-2009-286337 | 12/2009 |
| WO | WO 2011/101975 A1 | 8/2011 |

OTHER PUBLICATIONS

Apr. 27, 2010 International Search Report issued in International Application No. PCT/JP2010/054312 (with translation).

\* cited by examiner

*Primary Examiner* — John Walters
(74) *Attorney, Agent, or Firm* — Oliff & Berridge, PLC

(57) ABSTRACT

A vehicle includes a PCU serving as a power control unit controlling the electric power for vehicle running, a battery storing the electric power for vehicle running, and an EHC serving as an electrically heated catalyst. The PCU includes a converter, an inverter, and a positive line and a negative line each connecting the converter and the inverter. The converter boosts a voltage VL output from the battery to a requested voltage value VHsys. The EHC has a positive end connected to the positive line. The EHC also has a negative end connected to the negative line.

10 Claims, 6 Drawing Sheets

VEHICLE

TECHNICAL FIELD

The present invention relates to a vehicle provided with an electrically heated catalyst purifying the exhaust gas of an internal combustion engine.

BACKGROUND ART

The vehicle provided with an internal combustion engine is generally provided with a catalyst for purifying the exhaust gas of an internal combustion engine. Unless the temperature of this catalyst reaches an active temperature, the exhaust gas cannot be fully purified. Thus, an electrically heated catalyst (which will be hereinafter referred to as an "EHC") is conventionally proposed that is configured to have a catalyst which can be heated by an electric heater and the like.

With regard to the vehicle provided with an EHC, Japanese Patent Laying-Open No. 2004-192820 (PTL 1) discloses a vehicle including a fuel cell, an EHC and a DC/DC converter which converts a high voltage supplied from the fuel cell into a low voltage that can be supplied to the EHC and supplies the low voltage to the EHC.

CITATION LIST

Patent Literature

PTL 1: Japanese Patent Laying-Open No. 2004-192820
PTL 2: Japanese Patent Laying-Open No. 2009-274479

SUMMARY OF INVENTION

Technical Problem

As with the vehicle disclosed in PTL 1, a DC/DC converter dedicated to conversion of the voltage supplied from a battery into a voltage that can be supplied to the EHC is additionally provided, which may lead to an increase in cost. On the other hand, when the voltage supplied from the battery is applied to the EHC without being passed through the DC/DC converter, the electric power caused to pass through the EHC is not stabilized, which may cause variation in temperature rising performance of the EHC and overdischarge of the battery.

The present invention has been made to solve the above-described problems. An object of the present invention is to stabilize the electric power caused to pass through an electrically heated catalyst (EHC) without having to additionally provide a converter in a vehicle using electric power stored in a power storage device to generate a driving force.

Solution to Problem

A vehicle according to the present invention includes a power storage device; a converter boosting a voltage of electric power output from the power storage device to a prescribed value; a drive device using the electric power boosted by the converter to generate a driving force for the vehicle; a power supply path provided between the converter and the drive device; an internal combustion engine; and a catalyst device configured to be electrically heatable and purifying exhaust gas of the internal combustion engine. The catalyst device is connected to the power supply path in parallel to the drive device and heated with the electric power boosted by the converter.

Preferably, the vehicle further includes a relay provided between the power supply path and the catalyst device.

Preferably, the drive device includes an electric motor generating the driving force and an inverter converting the electric power boosted by the converter into electric power for driving the electric motor. The power supply path is provided between the converter and the inverter.

Preferably, the power supply path includes a first positive line and a first negative line each connecting the converter and the inverter. The catalyst device has a positive electrode and a negative electrode connected to the first positive line and the first negative line, respectively.

Preferably, the vehicle further includes a first relay provided between the positive electrode of the catalyst device and the first positive line, and a second relay provided between the negative electrode of the catalyst device and the first negative line.

Preferably, the power supply path includes a first positive line and a first negative line each connecting the converter and the inverter. The vehicle further includes a second positive line and a second negative line each connecting the converter and the power storage device. The catalyst device has a positive electrode connected to the first positive line and a negative electrode connected to the second negative line.

Preferably, the vehicle further includes a first relay provided between the first positive line and the positive electrode of the catalyst device, and a second relay provided between the second negative line and the negative electrode of the catalyst device.

Preferably, the converter, the inverter, the first positive line, and the first negative line are housed within a case. The vehicle further includes a third positive line disposed so as to pass through the case and connecting the positive electrode of the catalyst device and the first positive line, and a third negative line disposed outside of the case and connecting the negative electrode of the catalyst device and the second negative line.

Preferably, the converter and the inverter are disposed in a position corresponding to a front portion of the vehicle. The power storage device is disposed in a position corresponding to a rear portion of the vehicle. The catalyst device is located in a portion of the vehicle rearward with respect to the converter and the inverter, and located in a portion of the vehicle forward with respect to the power storage device. The third negative line is shorter in length than a line connecting the negative electrode of the catalyst device and the second negative line.

Preferably, the vehicle is capable of charging the power storage device with electric power supplied from an external power supply and capable of running with a driving force generated by at least one of the drive device and the internal combustion engine.

Advantageous Effects of Invention

According to the present invention, in the vehicle using the electric power stored in the power storage device to generate a driving force, the electric power caused to pass through an electrically heated catalyst (EHC) can be stabilized without having to provide an additional converter.

DESCRIPTION OF EMBODIMENTS

Figure 1:
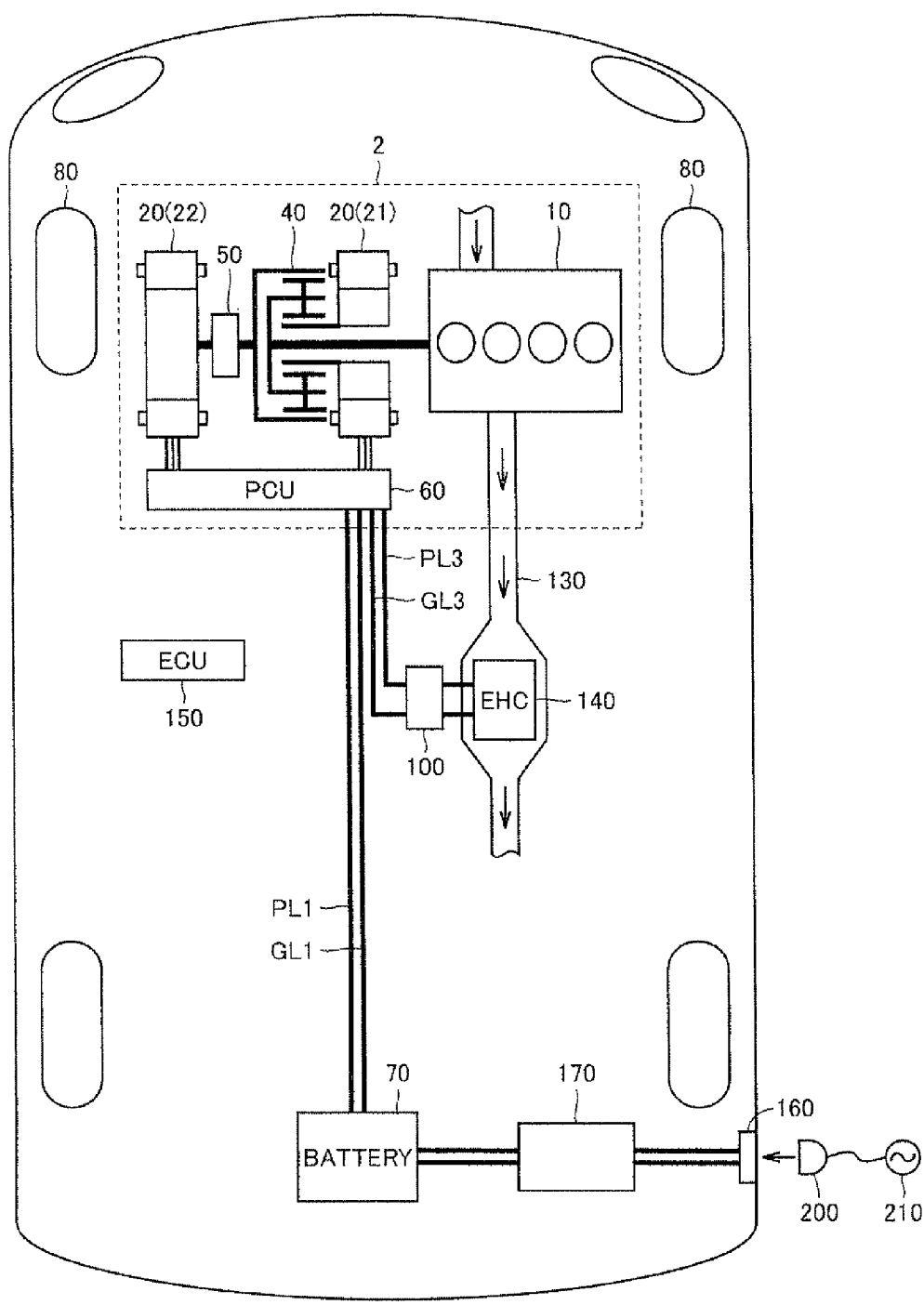
FIG. 1 is an entire block diagram (first) of a vehicle.

The embodiments of the present invention will be hereinafter described in detail with reference to the accompanying drawings, in which the same or corresponding components are designated by the same reference characters, and description thereof will not be repeated.

First Embodiment

FIG. 1 is an entire block diagram of a vehicle 1 according to the first embodiment of the present invention. Vehicle 1 includes an engine 10, an MG (Motor Generator) 20, a power split device 40, a reduction gear 50, a power control unit (hereinafter referred to as a "PCU") 60, a battery 70, a driving wheel 80, and an electronic control unit (hereinafter referred to as an "ECU") 150.

Engine 10 serves as an internal combustion engine generating a driving force which causes a crankshaft to be rotated by the combustion energy produced during combustion of air-fuel mixture of a fuel and air introduced into a combustion chamber.

MG 20 includes a first MG 21 and a second MG 22. First MG 21 and second MG 22 each serves as an alternating-current (AC) electric motor and, for example, as a three-phase AC synchronous electric motor. In the following description, when there is no need to distinguish between first MG 21 and second MG 22 for explanation, first MG 21 and second MG 22 are synonymously described as MG 20 without distinction.

Vehicle 1 is driven by the driving force output from at least one of engine 10 and MG 20. The driving force generated by engine 10 is divided by power split device 40 to be transmitted into two separate paths. In other words, one of the paths leads through reduction gear 50 to driving wheel 80 while the other of the paths leads to first MG 21.

Power split device 40 is formed of a planetary gear including a sun gear, a pinion gear, a carrier, and a ring gear. The pinion gear engages with the sun gear and the ring gear. The carrier supports the pinion gear in a rotatable manner and is coupled to the crankshaft of engine 10. The sun gear is coupled to the rotation shaft of first MG 21. The ring gear is coupled to the rotation shaft of second MG 22 and reduction gear 50.

PCU 60 is operated in accordance with the control signal from ECU 150, to control the electric power supplied from battery 70 to MG 20 or the electric power supplied from MG 20 to battery 70.

Engine 10, MG 20 (first MG 21 and second MG 22), power split device 40, reduction gear 50, and PCU 60 are disposed within a compartment 2 provided in the front portion of vehicle 1.

Battery 70 stores the electric power for driving MG 20. Battery 70 typically includes a direct-current (DC) secondary battery such as a nickel-metal hydride or lithium ion secondary battery. A voltage VL output from battery 70 is, for example, approximately 200 volts. Battery 70 is disposed in the space provided in the rear portion of vehicle 1 (for example, in the space located below a rear seat or the luggage space located behind the rear seat). A large-capacity capacitor may be used in place of battery 70.

The exhaust gas discharged from engine 10 is discharged to the atmosphere through an exhaust passage 130 provided below the floor of vehicle 1. Exhaust passage 130 extends from engine 10 to the rear end section of vehicle 1.

An EHC (electrically heated catalyst) 140 is provided in the middle of exhaust passage 130. EHC 140 is configured such that the catalyst purifying the exhaust gas can be electrically heated. It is to be noted that various well-known EHCs can be applied to EHC 140. EHC 140 is disposed between PCU 60 and battery 70 so as to extend in the front-to-rear direction of vehicle 1.

Battery 70 and PCU 60 are connected to each other via a positive line PL1 and a negative line GL1. PCU 60 and EHC 140 are connected to each other via a positive line PL3 and a negative line GL3. A junction box 100 is provided in positive line PL3 and negative line GL3. EHC 140 heats a catalyst with the electric power supplied from junction box 100.

Furthermore, vehicle 1 is a so-called plug-in hybrid vehicle and includes a charging port 160 and a charger 170 for charging battery 70 with the electric power from an external power supply 210.

Charging port 160 serves as a power interface for receiving electric power from external power supply 210. When battery 70 is charged from external power supply 210, a connector 200 of the charging cable for supplying the electric power from external power supply 210 to the vehicle is connected to charging port 160.

Charger 170 is electrically connected to charging port 160 and battery 70. Then, in the charging mode in which battery 70 is charged from external power supply 210, charger 170 performs voltage conversion of the electric power supplied from external power supply 210 to a voltage level of battery 70 based on a control signal from ECU 150. Then, charger 170 charges battery 70.

ECU 150 incorporating a CPU (Central Processing Unit) and memory which are not shown executes prescribed operation processing based on the map and the program stored in the memory and also on the detection results of a plurality of sensors which are not shown. Based on the results of the operation processing, ECU 150 then controls each device such that vehicle 1 is brought into a desired state. Alternatively, at least a part of ECU 150 may be configured so as to execute prescribed numerical/logical operation processing by hardware such as an electronic circuit.

Figure 2:
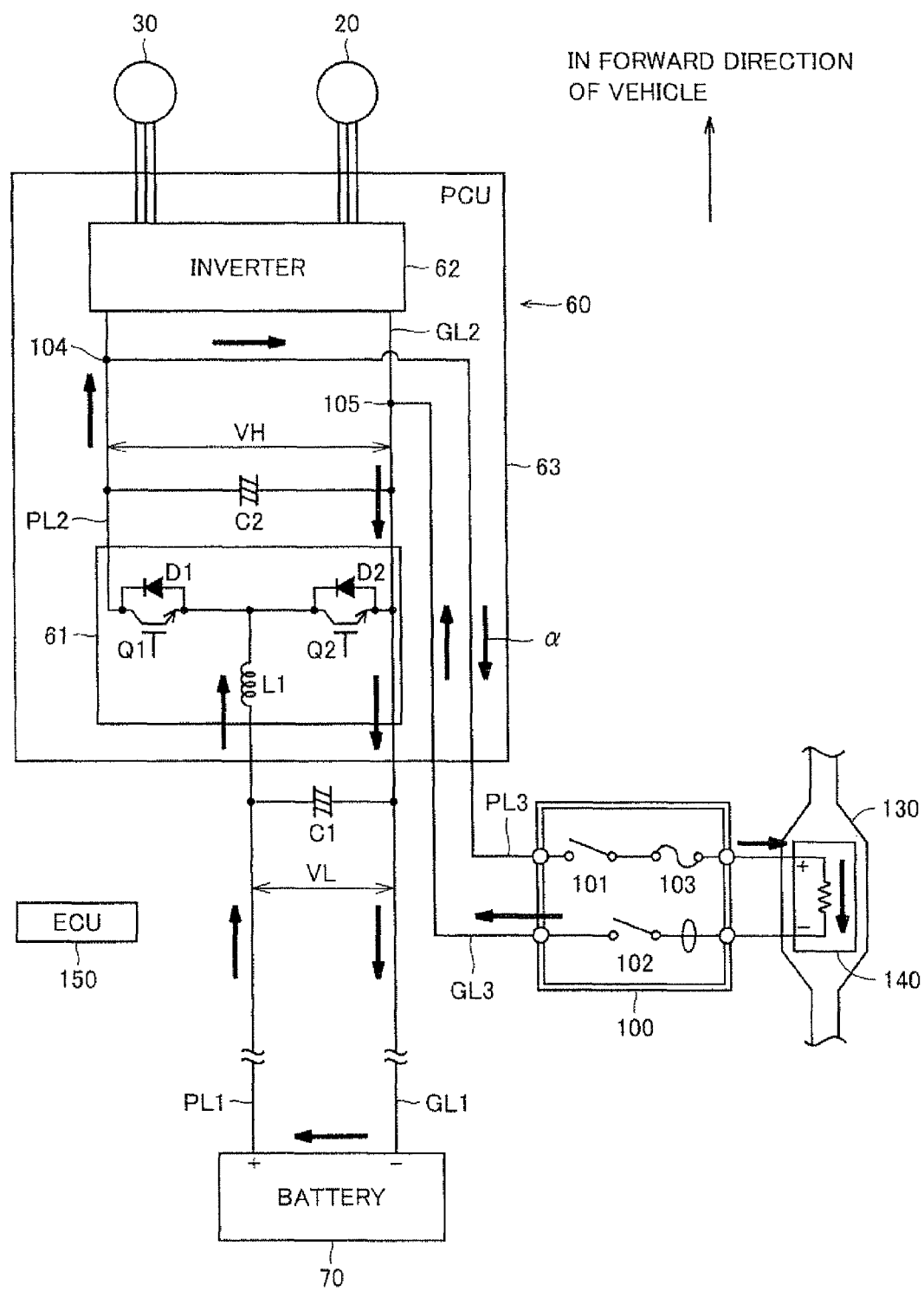
FIG. 2 is a circuit diagram (first) showing the connection relationship among a PCU, a battery and an EHC.

FIG. 2 is a circuit diagram showing the connection relationship among PCU 60, battery 70 and EHC 140 of vehicle 1 according to the first embodiment.

PCU 60 includes a converter 61, an inverter 62, and a positive line PL2 and a negative line GL2 each connecting converter 61 and inverter 62.

Converter 61 includes a reactor L1, switching elements Q1 and Q2, and diodes D1 and D2. An IGBT (Insulated Gate Bipolar Transistor) and the like can be used as each of switching elements Q1 and Q2. Switching elements Q1 and Q2 are connected in series between positive line PL2 and negative line GL2. Antiparallel diodes D1 and D2 are disposed for switching elements Q1 and Q2, respectively. Reactor L1 is connected between positive line PL1 and the intermediate point between switching elements Q1 and Q2.

A smoothing capacitor C2 is connected between positive line PL2 and negative line GL2. Smoothing capacitor C2 smoothes the DC voltage from converter 61.

Switching elements Q1 and Q2 are controlled by the signal from ECU 150 such that converter 61 boosts voltage VL output from battery 70 to a requested voltage value VHsys which is a requested value for a voltage VH of smoothing capacitor C2. This boosting operation allows voltage VH to be kept at the value requested by ECU 150. In addition, at the time when the voltage is lowered, converter 61 lowers voltage VH to voltage VL.

Inverter 62 is connected to converter 61 via positive line PL2 and negative line GL2. Inverter 62 is controlled by the signal from ECU 150. When MG 20 is driven, inverter 62 converts the DC power output from converter 61 to positive line PL2 into AC power, and then, supplies the AC power to MG 20. On the other hand, during regenerative braking, inverter 62 converts the AC power generated by MG 20 into DC power, and supplies the converted DC power through smoothing capacitor C2 to converter 61.

Converter 61 and battery 70 are connected to each other via positive line PL1 and negative line GL1. A smoothing capacitor C1 is provided between positive line PL1 and negative line GL1.

EHC 140 has a positive electrode connected through positive line PL3 to a point 104 on positive line PL2. EHC 140 also has a negative electrode connected through negative line GL3 to a point 105 on negative line GL2.

A case 63 of PCU 60 is provided with a through hole through which a total of four cables including positive lines PL1 and PL2 and negative lines GL1 and GL2 pass.

Junction box 100 is configured of a relay 101 and a fuse 103 provided in positive line PL3, and a relay 102 provided in negative line GL3. Relays 101 and 102 are controlled by the signal from ECU 150. When relays 101 and 102 are turned on, the electric power of battery 70 is supplied to EHC 140 through the path shown by an arrow α in FIG. 2. Then, EHC 140 is heated. On the other hand, when relays 101 and 102 are turned off, the electric power supplied from battery 70 to EHC 140 is interrupted.

Fuse 103 serves as a conductor when a current smaller than a rated current flows therethrough. When a current larger than a rated current flows, fuse 103 is melted and cut by the current flowing therethrough. Consequently, the current larger than a rated current is prevented from flowing into EHC 140. It is to be noted that fuse 103 may be provided outside of junction box 100.

ECU 150 uses voltage VL and voltage VH obtained by the sensor and the like to execute a feedback control operation (for example, proportional-plus-integral control) for bringing voltage VH closer to requested voltage value VHsys. In addition, requested voltage value VHsys may be a constant value, or may vary depending on the running state of vehicle 1. Then, ECU 150 outputs the control signal based on the result of the feedback control operation to switching elements Q1 and Q2 of converter 61. This causes converter 61 to be operated so as to boost voltage VL to requested voltage value VHsys. Thus, even if voltage VL varies, voltage VH is feedback-controlled to be set at a value in the neighborhood of requested voltage value VHsys.

Furthermore, ECU 150 determines that engine start is requested when the driving force requested by the user cannot be generated only by the output from MG 20 in the case where vehicle 1 is driven by the output from MG 20 while engine 10 is stopped.

Then, when ECU 150 determines that engine start is requested, ECU 150 determines whether the exhaust gas purification performance of EHC 140 is higher than the target level or not, for example, based on whether the temperature of EHC 140 is higher than a prescribed temperature or not. When the temperature of EHC 140 is higher than the prescribed temperature and the exhaust gas purification performance of EHC 140 is higher than the target level, ECU 150 starts engine 10 while maintaining relays 101 and 102 to be turned off to prevent the electric power from passing through EHC 140. On the other hand, when the temperature of EHC 140 is lower than the prescribed temperature and the exhaust gas purification performance of EHC 140 is lower than the target level, ECU 150 causes relays 101 and 102 to be turned from off to on in preparation for starting engine 10. This causes the electric power of battery 70 to be supplied to EHC 140 through the path shown by arrow α in FIG. 2, to thereby heat EHC 140. Consequently, the exhaust gas purification performance of EHC 140 is improved. Then, ECU 150 starts engine 10. In addition, as with vehicle 1 in the present embodiment, in the so-called plug-in hybrid vehicle, engine 10 is less frequently operated and the temperature of EHC 140 more frequently becomes lower than the prescribed temperature, as compared with a normal hybrid vehicle. Accordingly, it is more likely to increase the necessity of warm-up of the catalyst as described above.

The most characteristic point of vehicle 1 having the above-described structure is that one end of EHC 140 is connected to positive line PL2 and the other end of EHC 140 is connected to negative line GL2, to thereby cause voltage VH obtained by boosting voltage VL by converter 61 to be applied to EHC 140. In the following description, for the sake of explanation, the end of EHC 140 connected to the positive line is referred to as a "positive end of EHC 140" while the end of EHC 140 connected to the negative line is referred to as a "negative end of EHC 140".

Conventionally, the positive end and the negative end of EHC 140 are connected to positive line PL1 and negative line GL1, respectively, to cause voltage VL output from battery 70 to be applied to EHC 140 as it is. However, this conventional method poses a problem that a considerable variation may occur in the temperature rising performance of EHC 140. In other words, voltage VL output from battery 70 greatly varies depending on the state of battery 70 (for example, the state of charge of battery 70, the temperature of battery 70, the magnitude of the current flowing through battery 70, and the like). The variation range may be equal to or greater than 100 volts. Furthermore, the resistance value of EHC 140 varies with the temperature of EHC 140. Accordingly, merely when voltage VL output from battery 70 is applied to EHC 140, the electric power caused to pass through EHC 140 varies greatly depending on the states of battery 70 and EHC 140. Therefore, the electric power caused to pass through EHC 140 cannot be maintained at a stable value. Consequently, a considerable variation occurs also in the temperature rising performance of EHC 140.

In order to solve the problem caused by the conventional method as described above, the present embodiment is not configured such that voltage VL output from battery 70 is directly applied to EHC 140, but configured such that converter 61 is disposed between battery 70 and EHC 140 and voltage VH obtained by boosting voltage VL by converter 61 is applied to EHC 140. Thus, voltage VH is kept stable by the above-described feedback control to be in the neighborhood of requested voltage value VHsys, so that voltage VH does not greatly vary depending on the state of battery 70. Accordingly, as compared with the case where voltage VL output from battery 70 is simply applied to EHC 140, the electric power caused to pass through EHC 140 can be maintained at a stable value. Consequently, the temperature rising performance of EHC 140 can also be stabilized.

Furthermore, since voltage VH obtained by boosting voltage VL is applied to EHC 140, the value of the current flowing through EHC 140 can be kept low even when the same electric power is supplied to EHC 140, as compared with the case where voltage VL is applied to EHC 140. For example, assume that voltage VL=200 volts and voltage VH=400 volts.

In the conventional method, voltage VL=200 volts is applied to EHC 140 in order to supply 400 watts of electric power to EHC 140, which requires 2 amperes of current (=400 watts/ 200 volts) to flow through EHC 140. In contrast, in the method of the present embodiment, since voltage VH of 400 volts is applied to EHC 140, 1 ampere of current (=400 watts/400 volts) only needs to be applied to EHC 140. Thus, the value of the current flowing through EHC 140 can be kept low, which allows a decrease in the power loss occurring on the power passage of EHC 140. Furthermore, since an allowable current value can be set low when designing the power passage of EEC 140, the cost can be reduced.

Furthermore, in the present embodiment, the existing converter 61 incorporated in PCU 60 for driving the vehicle is used as a converter for supplying stable electric power to EHC 140. Accordingly, it is not necessary to additionally provide a dedicated converter and a cooling device therefor, so that a drive circuit of EHC 140 allowing a decrease in cost and size can be implemented.

Furthermore, in the present embodiment, junction box 100 including relays 101 and 102 controlled by ECH 150 is provided on the power passage between converter 61 and EHC 140. Consequently, passage of electric power to EHC 140 can be optionally switched to be started and stopped.

In the present embodiment, the present invention is applied to a plug-in hybrid vehicle which relatively highly requires warm-up of the catalyst. However, without being limited thereto, the present invention may also be applied to a normal hybrid vehicle. Furthermore, the present invention may be applied not to a hybrid vehicle having an engine serving as a driving source but to an electrically powered vehicle having an engine used for a purpose other than a driving source.

Second Embodiment

In vehicle 1 according to the above-described first embodiment, the positive end and the negative end of EHC 140 are connected to positive line PL2 and negative line GL2, respectively, within PCU 60.

In contrast, in a vehicle 1a according to the second embodiment, the positive end of EHC 140 is connected to positive line PL2 within PCU 60 while the negative end of EHC 140 is connected to negative line GL1 located outside of PCU 60. Since other structures, functions and processes are the same as those in the above-described first embodiment, detailed description thereof will not be repeated.

Figure 3:
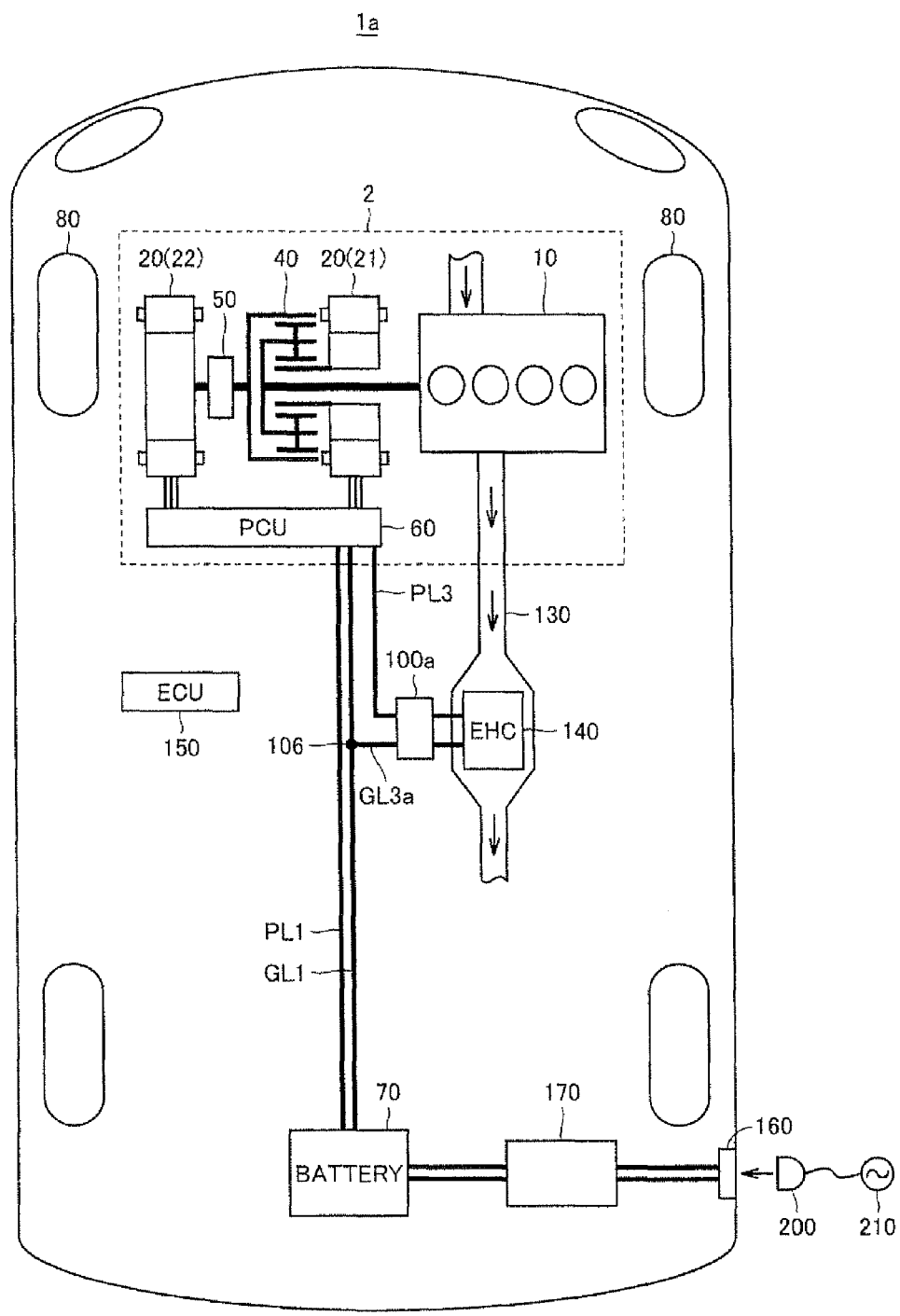
FIG. 3 is an entire block diagram (second) of the vehicle.

FIG. 3 is an entire block diagram of vehicle 1a according to the second embodiment. As shown in FIG. 3, the positive end of EHC 140 is connected to PCU 60 through positive line PL3 as in the above-described first embodiment. On the other hand, the negative end of EHC 140 is connected through a negative line GL3a to a point 106 on negative line GL1 located outside of PCU 60.

Figure 4:
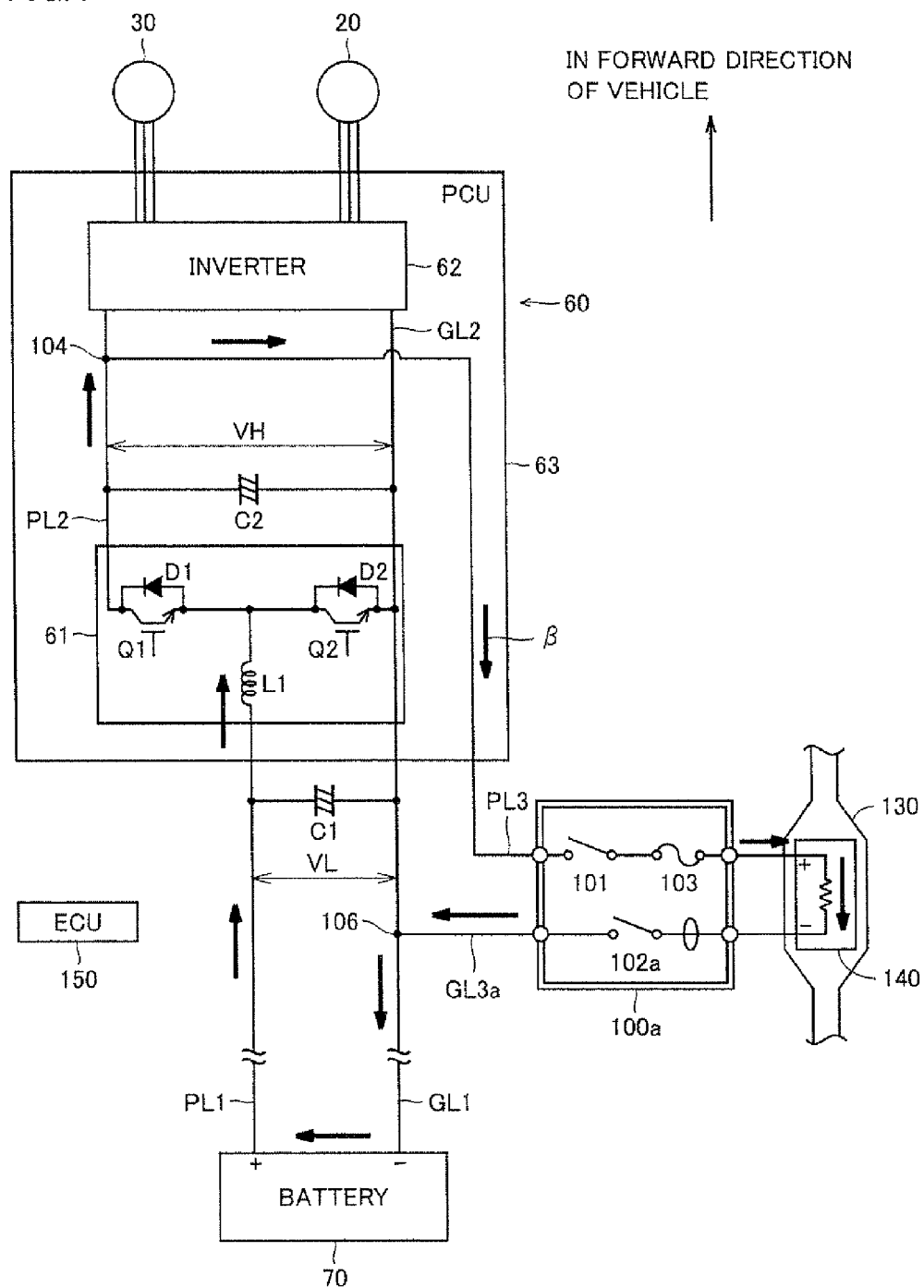
FIG. 4 is a circuit diagram (second) showing the connection relationship among the PCU, the battery and the EHC.

FIG. 4 is a detailed circuit diagram showing the connection relationship among PCU 60, battery 70 and EHC 140 of vehicle 1a according to the second embodiment.

As shown in FIG. 4, in vehicle 1a, the positive end of EHC 140 is connected to positive line PL2 through positive line PL3 disposed so as to pass through case 63 of PCU 60, as in the above-described first embodiment. However, in contrast to the above-described first embodiment, the negative end of EHC 140 is connected through positive line PL3 located outside of case 63 of PCU 60 to point 106 on negative line GL1 located outside of PCU 60. Furthermore, a junction box 100a includes a relay 101, a fuse 103, and a relay 102a that is provided on negative line GL3a.

Also based on the above-described connection relationship, voltage VH boosted by converter 61 can be applied to EHC 140 through the path shown by an arrow β in FIG. 4. Accordingly, the electric power caused to pass through EHC 140 can be kept at a stable value as in the first embodiment.

Furthermore, in the second embodiment, the number of lines each connecting the inside and the outside of PCU 60 is decreased as compared with the first embodiment. In other words, in the first embodiment, the number of lines each passing through case 63 of PCU 60 is a total of four including positive lines PL1 and PL3 and negative lines GL1 and GL3 (see FIG. 2 as described above). In contrast, negative line GL3a used in the second embodiment is routed to extend outside of PCU 60. Accordingly, in the second embodiment, the number of lines each passing through case 63 of PCU 60 is a total of three lines including positive lines PL1, PL3 and negative line GL1, which is less in number than the first embodiment. Accordingly, PCU 60 can be reduced in size. Furthermore, the routing structure of the lines in the vicinity of PCU 60 can be simplified. Since many other components such as engine 10 and MG 20 are disposed within compartment 2 having PCU 60 disposed therein, reduction in size of PCU 60 and simplification of the routing structure of lines in the vicinity of PCU 60 are particularly effective in designing the arrangement within compartment 2.

Furthermore, negative line GL3a used in the second embodiment is shorter than negative line GL3 used in the first embodiment. Negative line GL3 used in the first embodiment connects the negative end of EHC 140 and the inside of PCU 60 (see FIGS. 1 and 2). In contrast, negative line GL3a used in the second embodiment connects the negative end of EHC 140 and point 106 on negative line GL1 located outside of PCU 60 (see FIGS. 3 and 4). Since EHC 140 is disposed between PCU 60 disposed in the front portion of vehicle 1 and battery 70 disposed in the rear portion of vehicle 1, the routing path of negative line GL3a used in the second embodiment can be set shorter than the routing path of negative line GL3 used in the first embodiment. This allows a further reduction in noise, cost and weight.

Third Embodiment

In vehicle 1a according to the above-described second embodiment, negative line GL3a is connected to point 106 on negative line GL1 connecting converter 61 and battery 70. In other words, negative line GL1 is branched on the outside of junction box 100a.

In contrast, in a vehicle 1b according to the third embodiment, the negative line connecting converter 61 and battery 70 is branched on the inside of junction box 100a. Since other structures, functions and processes are the same as those in the above-described second embodiment, detailed description thereof will not be repeated.

Figure 5:
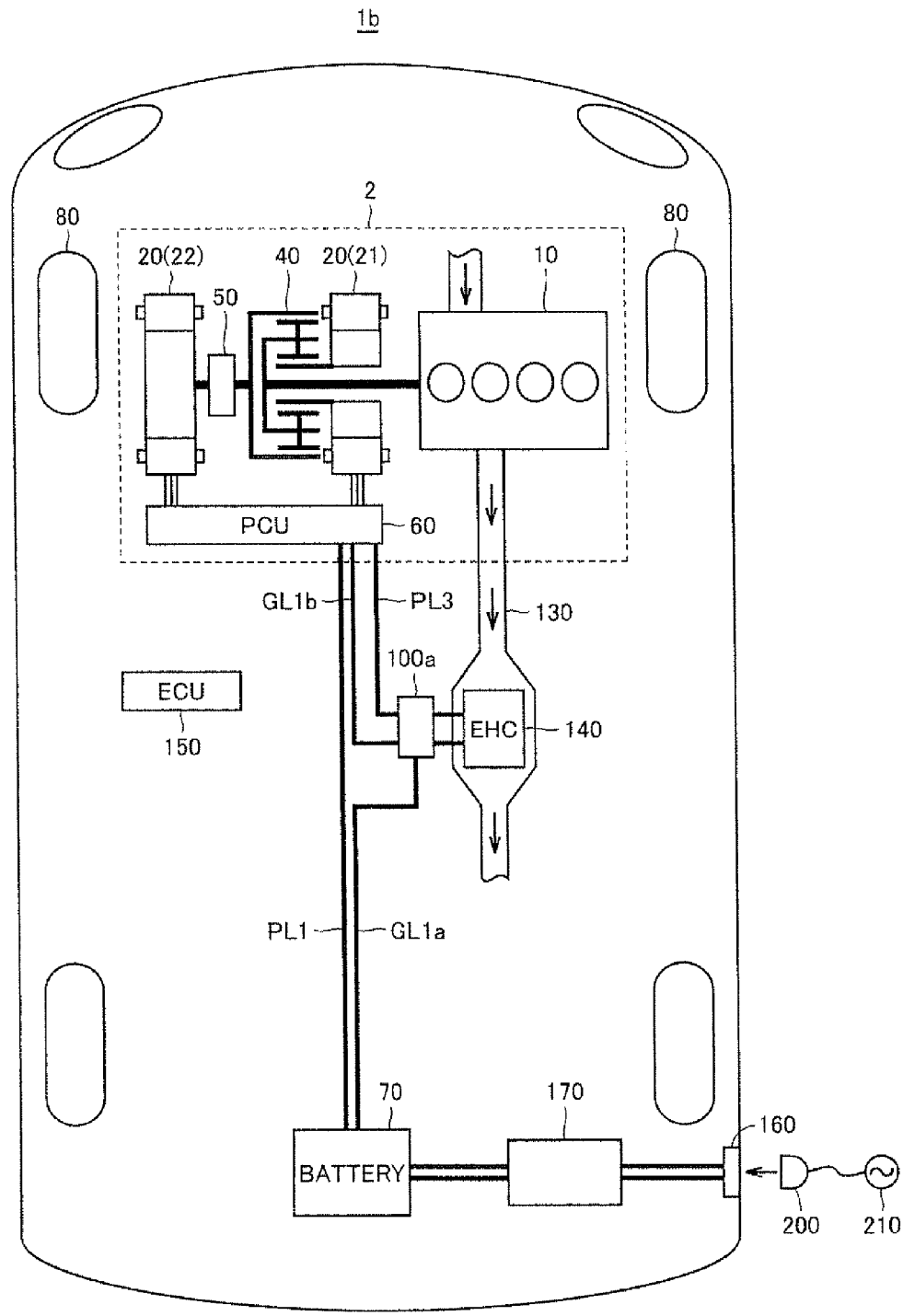
FIG. 5 is an entire block diagram (third) of the vehicle.
Figure 6:
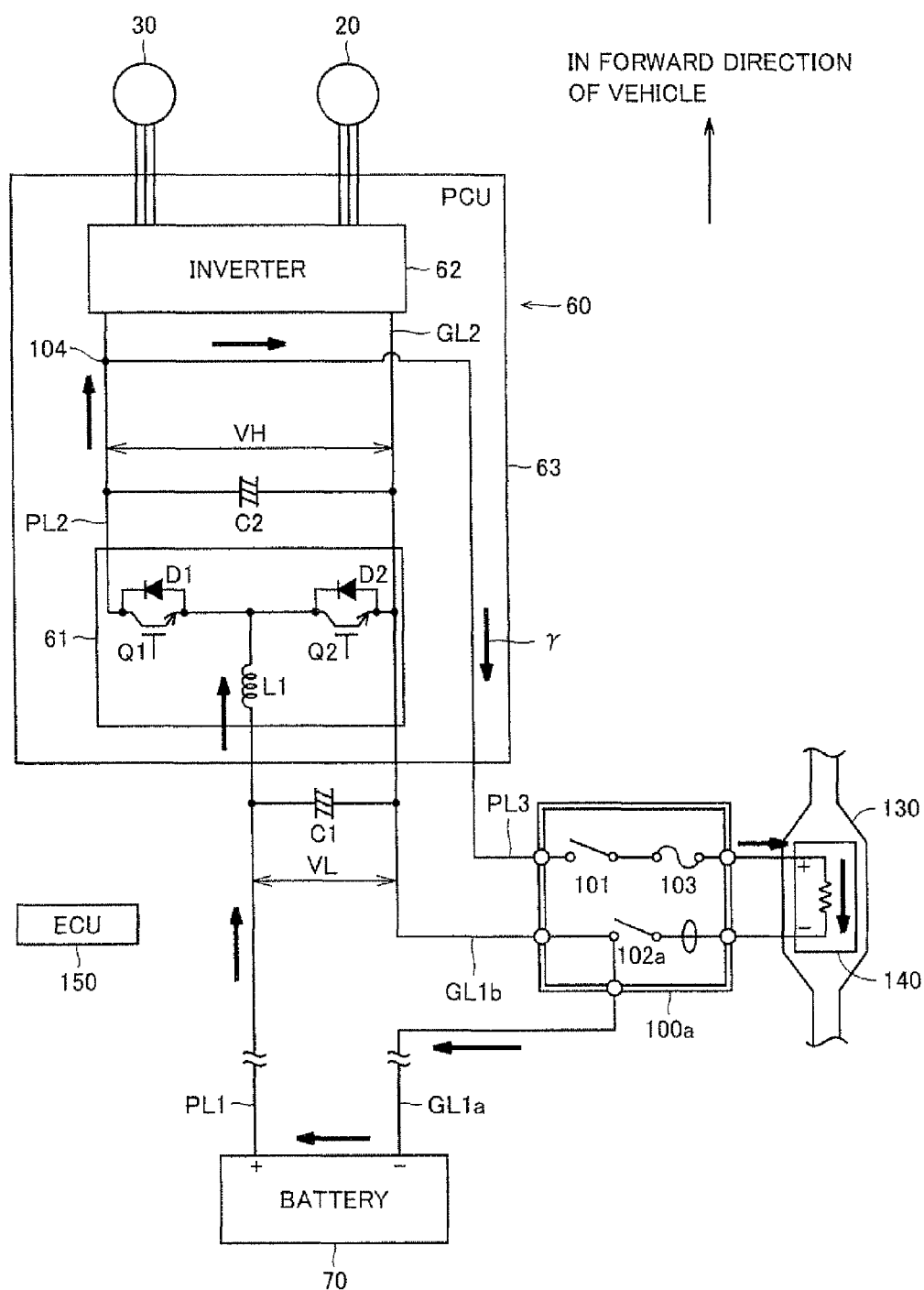
FIG. 6 is a circuit diagram (third) showing the connection relationship among the PCU, the battery and the EHC.

FIG. 5 is an entire block diagram of vehicle 1b according to the third embodiment. FIG. 6 is a detailed circuit diagram showing the connection relationship among PCU 60, battery 70 and EHC 140 of vehicle 1b according to the third embodiment.

As shown in FIGS. 5 and 6, in vehicle 1b according to the third embodiment, the negative line connecting converter 61 and battery 70 is divided into a negative line GL1a and a negative line GL1b which are connected to each other within junction box 100a. Then, negative line GL1a and negative line GL1b are connected to the negative end of EHC 140 through relay 102a provided within junction box 100a. In other words, the negative line connecting converter 61 and battery 70 is branched within junction box 100a.

Also based on the above-described connection relationship, voltage VH boosted by converter 61 can be applied to EHC 140 through the path shown by an arrow γ in FIG. 6. Accordingly, the electric power caused to pass through EHC 140 can be kept at a stable value as in the first and second embodiments.

Furthermore, in the third embodiment, the number of lines passing through case 63 of PCU 60 only needs to be a total of three lines including positive lines PL1, PL3 and negative line GL1b, which is less in number than the first embodiment. Accordingly, in the third embodiment, PCU 60 can be reduced in size and the routing structure of the lines in the vicinity of PCU 60 can also be simplified, as in the second embodiment.

Furthermore, the total length of negative line GL1a and negative line GL1b used in the third embodiment is shorter than the total length of negative line GL1 and negative line GL3 used in the first embodiment. In other words, the length of the entire negative line used in the third embodiment is shorter than the length of the entire negative line used in the first embodiment. This allows a further reduction in noise, cost and weight as in the second embodiment.

Furthermore, in the third embodiment, the negative line connecting converter 61 and battery 70 is branched within junction box 100a. In other words, it is often necessary in the normal case to provide a box for exclusive use for branching a high voltage cable such as a negative line connecting converter 61 and battery 70. On the other hand, in the third embodiment, a negative line (high voltage cable) connecting converter 61 and battery 70 is branched within junction box 100a having a relay used for switching passage of electric power to EHC 140 to be started and stopped. Accordingly, an increase in cost can be suppressed without having to additionally provide a box for exclusive use.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1, 1a, 1b vehicle, 2 compartment, 10 engine, 40 power split device, 50 reduction gear, 60 PCU, 61 converter, 62 inverter, 63 case, 70 battery, 80 driving wheel, 100, 100a junction box, 101, 102, 102a relay, 103 fuse, 130 exhaust passage, 140 EHC, 150 ECU, 160 charging port, 170 charger, 200 connector, 210 external power supply, C1, C2 smoothing capacitor, D1, D2 diode, GL1, GL1a, GL1b, GL2, GL3, GL3a negative line, L1 reactor, PL1 to PL3 positive line, Q1, Q2, Q1, Q2 switching element.

The invention claimed is:

1. A vehicle comprising:
a power storage device;
a converter boosting a voltage of electric power output from said power storage device to a prescribed value;
a drive device using the electric power boosted by said converter to generate a driving force for the vehicle;
a power supply path provided between said converter and said drive device;
an internal combustion engine; and
a catalyst device configured to be electrically heatable and purifying exhaust gas of said internal combustion engine,
said catalyst device being connected to said power supply path in parallel to said drive device and heated with the electric power boosted by said converter.

2. The vehicle according to claim 1, further comprising a relay provided between said power supply path and said catalyst device.

3. The vehicle according to claim 1, wherein
said drive device includes
an electric motor generating said driving force, and
an inverter converting the electric power boosted by said converter into electric power for driving said electric motor, and
said power supply path is provided between said converter and said inverter.

4. The vehicle according to claim 3, wherein
said power supply path includes a first positive line and a first negative line each connecting said converter and said inverter, and
said catalyst device has a positive electrode and a negative electrode connected to said first positive line and said first negative line, respectively.

5. The vehicle according to claim 4, further comprising:
a first relay provided between the positive electrode of said catalyst device and said first positive line; and
a second relay provided between the negative electrode of said catalyst device and said first negative line.

6. The vehicle according to claim 3, wherein
said power supply path includes a first positive line and a first negative line each connecting said converter and said inverter,
said vehicle further comprises a second positive line and a second negative line each connecting said converter and said power storage device, and
said catalyst device has a positive electrode connected to said first positive line and a negative electrode connected to said second negative line.

7. The vehicle according to claim 6, further comprising:
a first relay provided between said first positive line and the positive electrode of said catalyst device; and
a second relay provided between said second negative line and the negative electrode of said catalyst device.

8. The vehicle according to claim 6, wherein
said converter, said inverter, said first positive line, and said first negative line are housed within a case, and
said vehicle further comprises:
a third positive line disposed so as to pass through said case and connecting the positive electrode of said catalyst device and said first positive line; and
a third negative line disposed outside of said case and connecting the negative electrode of said catalyst device and said second negative line.

9. The vehicle according to claim 8, wherein
said converter and said inverter are disposed in a position corresponding to a front portion of the vehicle,
said power storage device is disposed in a position corresponding to a rear portion of the vehicle,
said catalyst device is located in a portion of the vehicle rearward with respect to said converter and said inverter, and located in a portion of the vehicle forward with respect to said power storage device, and
said third negative line is shorter in length than a line connecting the negative electrode of said catalyst device and said second negative line.

10. The vehicle according to claim 1, wherein said vehicle is capable of charging said power storage device with electric power supplied from an external power supply and capable of running with a driving force generated by at least one of said drive device and said internal combustion engine.

* * * * *